US012804510B2

(12) United States Patent
Fujinami

(10) Patent No.: US 12,804,510 B2
(45) Date of Patent: Nov. 17, 2026

(54) BASE STATION, COMMUNICATION PATH SETTING METHOD, AND PROGRAM

(71) Applicant: NEC Corporation, Tokyo (JP)

(72) Inventor: Makoto Fujinami, Tokyo (JP)

(73) Assignee: NEC CORPORATION, Tokyo (JP)

(*) Notice: Subject to any disclaimer, the term of this patent is extended or adjusted under 35 U.S.C. 154(b) by 333 days.

(21) Appl. No.: 18/600,921

(22) Filed: Mar. 11, 2024

(65) Prior Publication Data

US 2024/0334301 A1 Oct. 3, 2024

(30) Foreign Application Priority Data

Mar. 27, 2023 (JP) ................................ 2023-049908

(51) Int. Cl.
*H04W 40/20* (2009.01)
*H04W 40/28* (2009.01)
*H04W 40/30* (2009.01)

(52) U.S. Cl.
CPC ........... *H04W 40/20* (2013.01); *H04W 40/30* (2013.01)

(58) Field of Classification Search
CPC ...... H04W 40/20; H04W 40/30; H04W 40/28
See application file for complete search history.

(56) References Cited

U.S. PATENT DOCUMENTS

2006/0084470 A1 4/2006 Hashimoto et al.
2017/0280360 A1 9/2017 Salkintzis
2017/0303229 A1* 10/2017 Ohta .................... H04W 8/005
2017/0339620 A1 11/2017 Ohta et al.
2022/0110152 A1* 4/2022 Lim .................... H04W 74/006
2022/0201507 A1 6/2022 Gan et al.
2024/0334199 A1* 10/2024 Fujinami ............. H04W 64/003
2026/0059372 A1* 2/2026 Balakrishnan .......... H04L 45/02

FOREIGN PATENT DOCUMENTS

JP 2002-345031 A 11/2002
JP 2006-121180 A 5/2006
JP 2006-191519 A 7/2006
JP 2022-100185 A 7/2022
WO 2016/135838 A1 9/2016

OTHER PUBLICATIONS

JP Office Action for Japanese Patent Application No. 2023-049908, mailed on May 21, 2024 with English Translation.

* cited by examiner

*Primary Examiner* — Kent Krueger

(57) ABSTRACT

The base station includes: a position information acquisition unit that acquires position information of the base station; a subordinate terminal information sharing unit that shares the position information of the base station and subordinate terminal information of the base station with one or more peripheral base stations in a vicinity of the base station, and acquires position information for each of the peripheral base stations and subordinate terminal information for each of the peripheral base stations; a communication request acceptance unit that accepts a communication request from a first communication terminal being subordinate to the base station to a second communication terminal being subordinate to one of the peripheral base stations; and a path setting unit that sets a communication path from the first communication terminal to the second communication terminal, based on position information of the base station, position information of each peripheral base station, and subordinate terminal information.

20 Claims, 8 Drawing Sheets

BASE STATION, COMMUNICATION PATH SETTING METHOD, AND PROGRAM

INCORPORATION BY REFERENCE

This application is based upon and claims the benefit of priority from Japanese patent application No. 2023-049908, filed on Mar. 27, 2023, the disclosure of which is incorporated herein in its entirety by reference.

TECHNICAL FIELD

The present disclosure relates to a base station, a communication path setting method, and a program.

BACKGROUND ART

Japanese Unexamined Patent Application Publication No. 2006-191519 discloses a communication system that, in a network being configured by connecting a plurality of terminals that perform short-range local communication by wireless to one another and performing communication using a plurality of terminals as virtual relay nodes, can determine a communication path from a communication source terminal to a communication destination terminal while reducing a communication amount in each terminal, and perform communication.

SUMMARY

A base station that can be brought to and used in a disaster-stricken area in a disaster and an event venue with a poor communication environment has been required. In such an environment, a plurality of base stations may be used in cooperation with one another in order to secure a coverage area having a wide range. However, instead of each of a plurality of base stations being connected to cores on a cloud, when each base station is provided with a core, and is independent one another, a communication terminal cannot use another base station even when the communication terminal is connected to a certain base station.

The present disclosure has been made in order to solve such a problem, and an example object of the present disclosure is to provide a base station and the like being capable of setting a communication path across a plurality of base stations when a plurality of integrated-type base stations including a core are used in cooperation with one another.

In a first example aspect of the present disclosure, a base station includes:

- a position information acquisition unit configured to acquire position information of a base station;
- a subordinate terminal information sharing unit configured to directly or indirectly share the position information of the base station and subordinate terminal information of the base station with one or more peripheral base stations in a vicinity of the base station, and acquire position information for each of the peripheral base stations and subordinate terminal information for each of the peripheral base stations;
- a communication request acceptance unit configured to accept a communication request from a first communication terminal being subordinate to the base station to a second communication terminal being subordinate to one of the peripheral base stations; and a path setting unit configured to set a communication path from the first communication terminal to the second communication terminal, based on position information of the base station, position information of each peripheral base station, and subordinate terminal information of the one of the peripheral base stations.

In a second example aspect of the present disclosure, a communication path setting method includes:

- acquiring position information of a base station;
- directly or indirectly sharing the position information of the base station and subordinate terminal information of the base station with one or more peripheral base stations in a vicinity of the base station, and acquiring position information for each of the peripheral base stations and subordinate terminal information for each of the peripheral base stations;
- accepting a communication request from a first communication terminal being subordinate to the base station to a second communication terminal being subordinate to one of the peripheral base stations; and
- setting a communication path from the first communication terminal to the second communication terminal, based on position information of the base station, position information of each peripheral base station, and subordinate terminal information of the one of the peripheral base stations.

In a third example aspect of the present disclosure, a program causing a computer to execute:

- acquiring position information of a base station;
- directly or indirectly sharing the position information of the base station and subordinate terminal information of the base station with one or more peripheral base stations in a vicinity of the base station, and acquiring position information for each of the peripheral base stations and subordinate terminal information for each of the peripheral base stations;
- accepting a communication request from a first communication terminal being subordinate to the base station to a second communication terminal being subordinate to one of the peripheral base stations; and
- setting a communication path from the first communication terminal to the second communication terminal, based on position information of the base station, position information of each peripheral base station, and subordinate terminal information of the one of the peripheral base stations.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

First Example Embodiment

Hereinafter, an example embodiment will be described with reference to the drawings.

Figure 1:
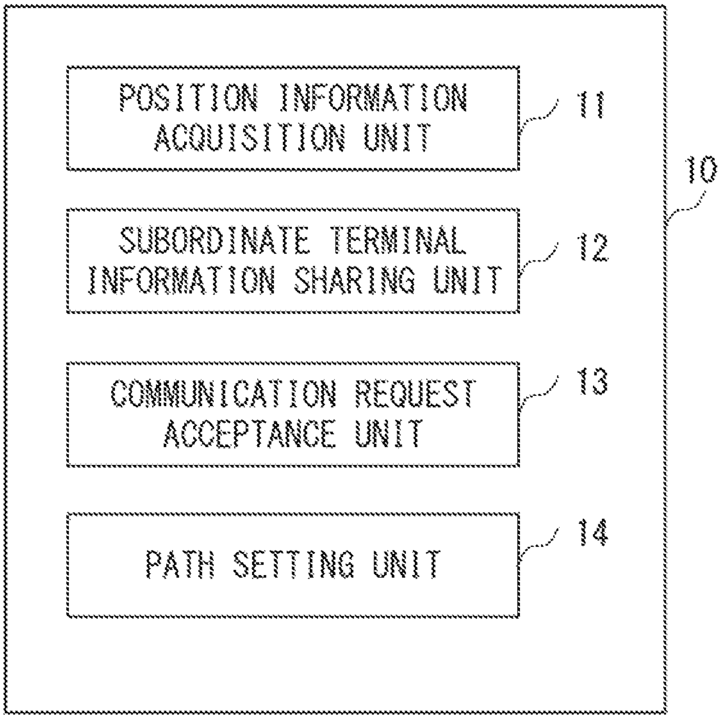
FIG. 1 is a block diagram illustrating a configuration of a base station according to a first example embodiment.

FIG. 1 is a block diagram illustrating a configuration of a base station according to a first example embodiment.

A base station 10 can operate according to any of a variety of possible cellular communication standards. The base station 10 may be an integrated-type base station including a core. The base station 10 may be used with another peripheral base station in a vicinity of the base station 10. The peripheral base station may include not only an adjacent base station being adjacent to the base station 10 but also a base station existing beyond the adjacent base station from the base station 10 and being capable of communicating with the base station 10. Note that, although description proceeds as that the base station 10 is an integrated-type base station including a core, similar processing is achievable even when the base station 10 is a non-built-in type.

The base station 10 includes a processor, a memory, a communication interface, and the like. As illustrated in FIG. 1, the base station 10 includes a position information acquisition unit 11, a subordinate terminal information sharing unit 12, a communication request acceptance unit 13, and a path setting unit 14.

The position information acquisition unit 11 acquires position information of a base station. The subordinate terminal information sharing unit 12 directly or indirectly shares the position information of the base station and subordinate terminal information of the base station with one or more peripheral base stations in a vicinity of the base station, and acquires position information for each of the peripheral base stations and subordinate terminal information for each of the peripheral base stations. Note that, a method of sharing information between the base station and the peripheral base station may include transmission and reception via an external network that directly transmits and receives between the base stations, transmission and reception via a cloud (via an external server somewhere), cross-reference by accessing an external network or a cloud by each of the base station and the peripheral base station, or the like.

The communication request acceptance unit 13 accepts a communication request from a first communication terminal being subordinate to the base station to a second communication terminal being subordinate to one of the peripheral base stations. The path setting unit 14 sets a communication path from the first communication terminal to the second communication terminal, based on position information of the base station, position information of each peripheral base station, and subordinate terminal information of one of the peripheral base stations.

Figure 2:
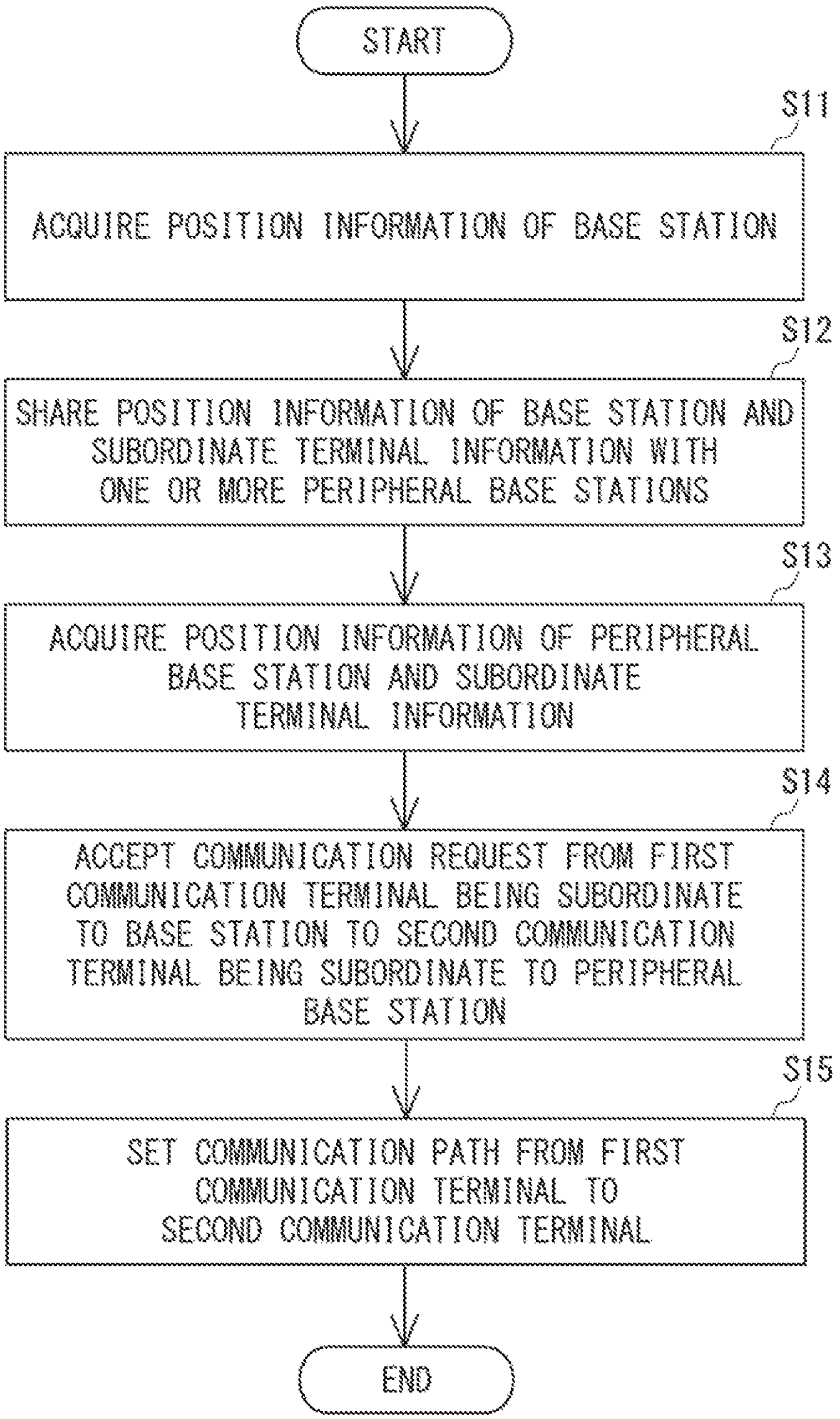
FIG. 2 is a flowchart illustrating a communication path setting method according to the first example embodiment.

FIG. 2 is a flowchart illustrating a communication path setting method according to the first example embodiment. The position information acquisition unit 11 acquires position information of a base station (step S11). The subordinate terminal information sharing unit 12 directly or indirectly shares the position information of the base station and subordinate terminal information of the base station with one or more peripheral base stations in the vicinity of the base station (step S12). Furthermore, the subordinate terminal information sharing unit 12 acquires position information for each of the peripheral base stations and subordinate terminal information for each of the peripheral base stations (step S13).

The communication request acceptance unit 13 accepts a communication request from a first communication terminal being subordinate to the base station to a second communication terminal being subordinate to one of the peripheral base stations (step S14). The path setting unit 14 sets a communication path from the first communication terminal to the second communication terminal, based on position information of the base station, position information of each peripheral base station, and subordinate terminal information of the one of the peripheral base stations (step S15).

According to the first example embodiment described above, even in an integrated-type base station including a core, it is possible to set an appropriate communication path by sharing position information and subordinate terminal information between peripheral base stations.

Second Example Embodiment

Figure 3:
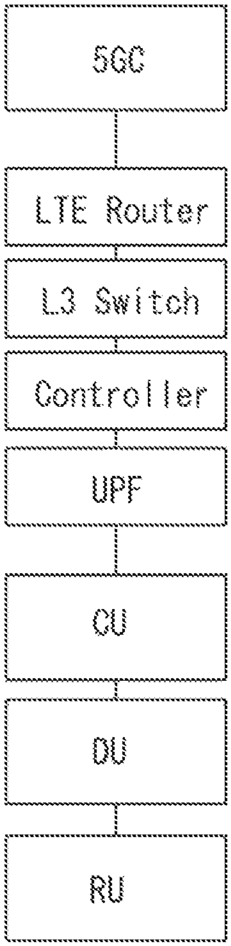
FIG. 3 is a block diagram illustrating a configuration of a general base station.

FIG. 3 is a block diagram illustrating a configuration of a general base station.

In a general base station configuration, as illustrated in FIG. 3, a core (5GC) and a base station are separated with each other. The core is communicably connected to a plurality of base stations and the like in a one-to-many relationship. Even when a communication terminal wirelessly connected to each base station moves between a plurality of base stations, the core can perform processing (handover processing) of switching a base station or the like to be communicated, or the like.

The 5GC is generally located in a cloud, and includes an AMF and an SMF both performing a C-plane function, and a user plane function (UPF) being located on-premise. The UPF provides a function being specific to U-plane processing of transferring packet data of user data. The base station includes a radio unit (RU), a distributed unit (DU), and a central unit (CU). In some example embodiments, each of the radio unit (RU), the distributed unit (DU), and the central unit (CU) may be a separate server.

The RU is an antenna portion of the base station, transmits and receives a radio wave to and from a user equipment (UE), and communicates with the DU. The DU is also referred to as a slave station, and mainly performs modulation and demodulation (conversion between analog and digital) of a signal and retransmission of a missing signal. The CU performs control of a plurality of DUs and control of radio resource control (RRC) being a communication protocol between the UE and the base station.

Figure 4:
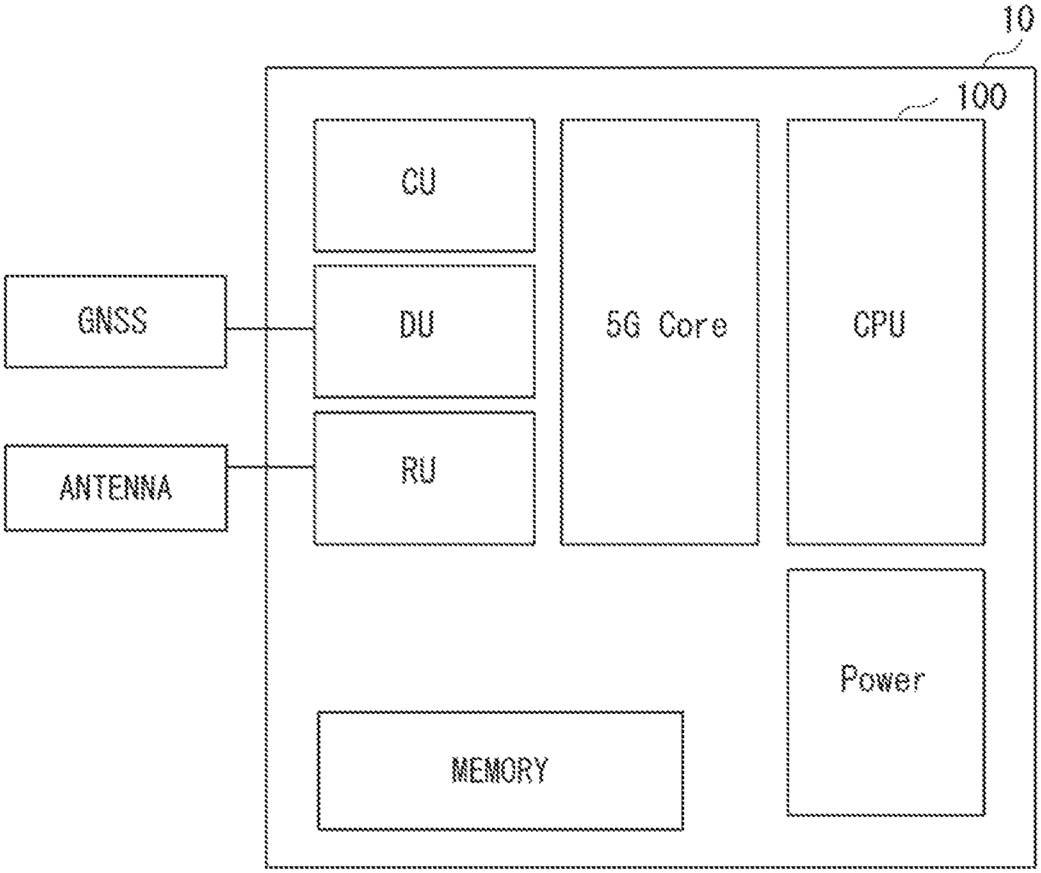
FIG. 4 is a block diagram illustrating a configuration of an integrated-type base station according to a second example embodiment.

FIG. 4 is a block diagram illustrating a configuration of an integrated-type base station according to a second example embodiment of the present disclosure.

When being used in the present specification, the integrated-type base station refers to a base station with a 5G core network (5GC). For example, the base station may be a 3GPP (registered trademark) 5G NR gNB, but is not limited thereto. A base station may be able to operate according to any of a variety of other possible cellular communication standards. In some example embodiments, an integrated-type base station 10 may include an application server.

In the integrated-type base station 10 incorporating a core function according to the second example embodiment of the present disclosure, the 5GC includes a UPF. Hereinafter, the 5GC including the UPF will be described as a core. Note that, whether a UPF function is actually performed depends on an operating environment of a base station, and in some example embodiments, the UPF function may not be performed. The integrated-type base station 10 includes a radio unit (RU), a distributed unit (DU), and a central unit (CU). In FIG. 4, the RU is connected to an antenna (an RF antenna, a radio antenna). Further, the DU is connected to a global navigation satellite systems (GNSS) receiver. Further, the base station 10 also includes a processor such as a central processing unit (CPU), a memory, an antenna having a directivity, a power supply such as a battery, and the like.

The processor reads and executes software (a computer program) from the memory, and thereby performs processing of the base station 10 and the like described by using a flowchart in the example embodiment. The processor may be, for example, a microprocessor, a micro processing unit (MPU), or a central processing unit (CPU). The processor may include a plurality of processors.

The memory is configured by a combination of a volatile memory and a non-volatile memory. The memory may include a storage located away from the processor. In this case, the processor may access the memory via a not-illustrated I/O interface.

Since the integrated-type base station 10 of the present disclosure is a base station being provided with a core network (CN) including the UPF that bears a U-plane, one 5G communication network can be established across a plurality of base stations when inter-base-station communication (or inter-core communication) can be achieved. The inter-base-station communication may be not only direct transmission and reception between base stations, but also transmission and reception via an external network or transmission and reception via a cloud. Each base station may access the cloud and perform cross-reference. Further, the integrated-type base station 10 includes the UPF function. When executing the UPF function, the integrated-type base station 10 functions as a base station being capable of performing both a C-plane and U-plane functions. Since the 5G communication is broadband communication (having higher communication speed), higher CPU processing performance is required for the U-plane function than that of an existing base station.

Figure 5:
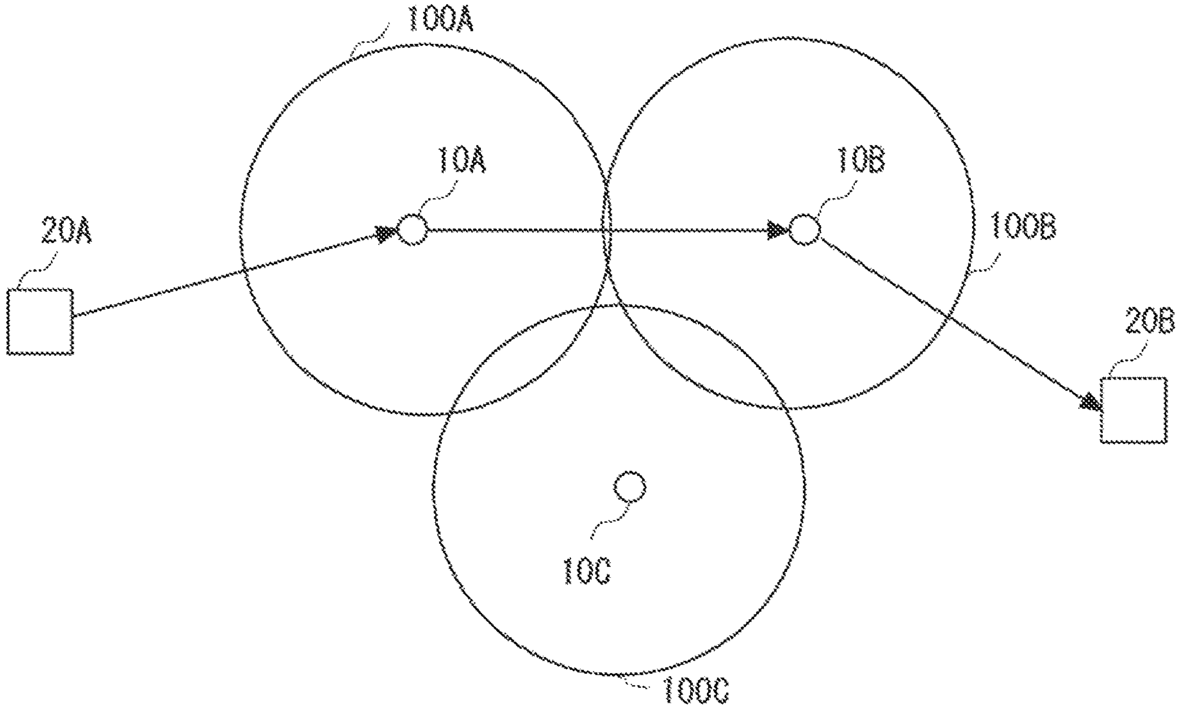
FIG. 5 is a diagram describing an example of using a plurality of base stations according to the second example embodiment.

FIG. 5 is a top view describing an example of using a plurality of integrated-type base stations.

The above-described integrated-type base station 10 can be accommodated in a single housing and can be carried, and thus can be brought to and used in a disaster-stricken area in a disaster even when there is no carrier line, as long as there is a power supply. Thus, the integrated-type base station 10 is also referred to as a hand-carried type base station. In this case, as illustrated in FIG. 5, a plurality of integrated-type base stations (10A, 10B, and 10C in FIG. 5) may be used in cooperation with each other in order to secure coverage areas having a wide range (100A, 100B, and 100C in FIG. 5). However, instead of each of the base stations 10A to 10C being connected to cores on a cloud, there is a case where each of the base stations 10A to 10C is provided with a core, and is independent each other, as described above. Therefore, a communication terminal 20A may not be able to use the base station 10B and the base station 10C even when it is connected to the base station 10A. Then, in the present disclosure, for example, as illustrated in FIG. 5, a mechanism that, when the communication terminal 20A makes a communication request with a communication terminal 20B as a connection destination to the base station 10A, the base station 10A recognizes the communication terminal 20B connected to the base station 10B by the inter-base-station communication, and thereby can set a communication path via a peripheral base station has been proposed. As a result, as illustrated in FIG. 5, the communication terminal 20A can communicate with the communication terminal 20B via the base station 10A and the base station 10B. Details of a communication path setting method will be described later.

Note that, in the example illustrated in FIG. 5, since each integrated-type base station uses an antenna having no directivity, the base station emits a radio wave uniformly in all directions (as illustrated in FIG. 5, it can be a coverage area having a substantially circular shape). An antenna having a directivity may be used.

Currently, both a carrier 5G and a local 5G adopt time division duplex (TDD) that inverts a communication direction at each very short time. In order to achieve switching of the communication direction of an uplink (UL) signal and a downlink (DL) signal, and to satisfy a synchronization requirement, it is required to calculate an accurate time at each location, based on a GPS signal acquired from an atomic clock and a satellite antenna mounted on a GPS satellite. Thus, a base station for the carrier 5G and the local 5G includes a positioning function equivalent to a GPS receiver. Examples of a satellite positioning system include a global positioning system (GPS), and global navigation satellite systems (GNSS), but are not limited thereto. Therefore, the base station according to the present disclosure uses the position acquisition function, and after each base station acquires position information, each of the base stations shares the position information with each other in advance through the inter-base-station communication. The inter-base-station communication may be performed at each very short time.

Further, a base station acquires information of a communication terminal being subordinate to the base station, and shares the communication terminal being subordinate to each of the base stations by the inter-base-station communication. Specifically, it is as follows.

The communication terminal being subordinate to each of the base stations can grasp an IP address of a communication terminal by similar processing to a principle of an address resolution protocol (ARP). For example, a calling-side communication terminal broadcasts a request equivalent to an ARP request to a reception-side communication terminal. The reception-side communication terminal acquiring the request returns a response to the calling-side communication terminal with an own MAC address as a transmission source. The response is sent by unicast with a transmission source MAC address of the broadcast as a destination. Through the process, the calling-side communication terminal recognizes the MAC address of the reception-side communication terminal, and thereby can communication subsequently by unicast.

It is assumed that each base station independently assigns an IP address having a segment being different from each base station to a communication terminal being subordinate to the base station. In that case, the following is established.

The IP address of a terminal being subordinate to an A base station (192.168.0.1) is 192.168.0.2 (a terminal A2). 192.168.0.3 (a terminal A3). 192.168.0.4 (a terminal A4) . . . .

The IP address of a terminal being subordinate to a B base station (192.168.1.1) is 192.168.1.2 (a terminal B2). 192.168.1.3 (a terminal B3). 192.168.1.4 (a terminal B4) . . . .

The IP address of a terminal being subordinate to a C base station (192.168.2.1) is 192.168.2.2 (a terminal C2). 192.168.2.3 (a terminal C3). 192.168.2.4. (a terminal C4).

The base stations A, B, and C can grasp, by the inter-base-station communication with each other, a geographical positional relationship, a communication path to a terminal being subordinate to each base station (which base station should be path through), latitude and longitude information of the base station, and an IP address of the terminal (IP address being subordinate to which base station).

In other words, as an operation of the entire system, first, at a stage where a plurality of base stations are arranged, each base station exchanges position information with each other, and grasps what kind of logical relationship and connection relationship exist and what IP address of the base station is. The base station plays a router role, and each base station independently generates a logical connection map of A-B-C.

Next, the A2 terminal connects subordinate to the A base station, the C2 terminal connects subordinate to the C base station, and 192.168.0.2 (the terminal A2), and 192.168.2.2 (the terminal C2). are assigned to each terminal.

The terminal A2 broadcasts an ARP packet and a name resolution packet (such as DNS) to know the IP address of terminal C2. The terminal A2 acquires the IP address 192.168.2.2 and the MAC address of the interface as a source IP address and a source MAC address, respectively, in response to the response from the terminal C2.

Finally, the terminal A2 starts communication addressed to the IP address and the MAC address of the terminal C2.

When the terminal A2 transmits a packet addressed to the terminal C2 to the base station A, a subsequent path is transferred to the base station C by a path determined in advance by the positional relationship between the base stations.

Figure 6:
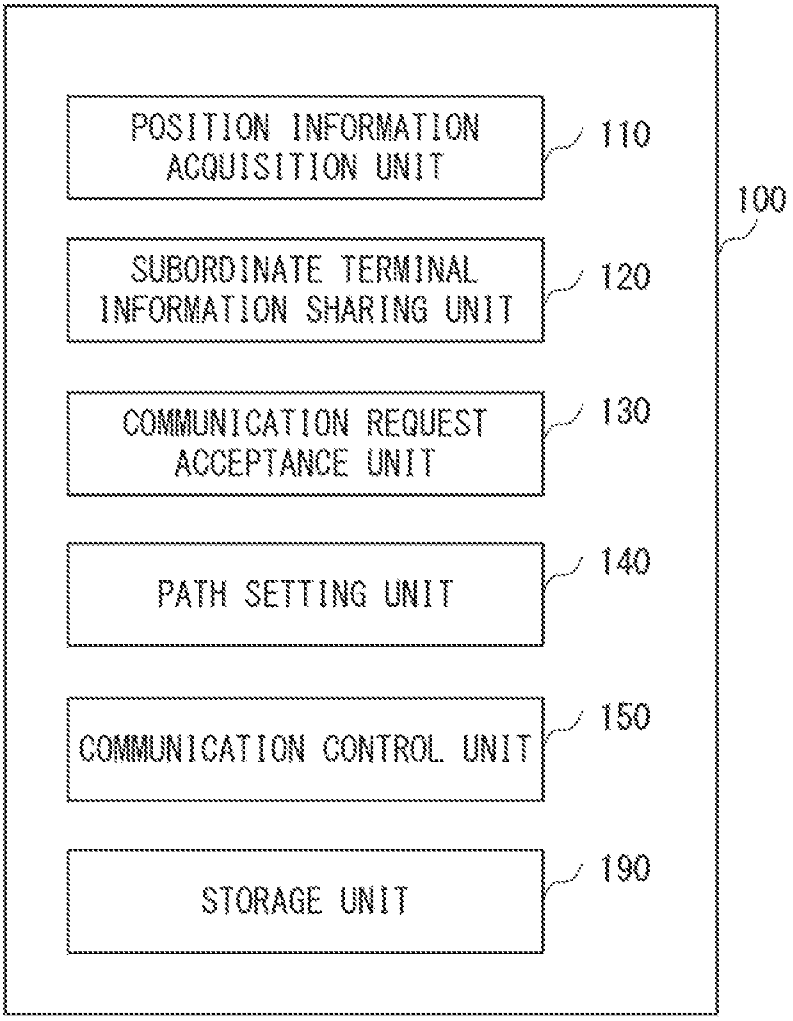
FIG. 6 is a diagram illustrating functional blocks of a control unit of the base station according to the second example embodiment.

FIG. 6 is a diagram illustrating functional blocks of a control unit of a base station.

A control unit 100 includes a position information acquisition unit 110, a subordinate terminal information sharing unit 120, a communication request acceptance unit 130, a path setting unit 140, a communication control unit 150, and a storage unit 190. The control unit 100 functions as a functional arithmetic unit that executes each of these pieces of subdivided processing by executing a program.

The position information acquisition unit 110 acquires position information of a base station. The position information acquisition unit 110 can acquire position information (e.g., longitude, latitude, and the like) of the base station 10A by using the GNSS receiver. The position information acquisition unit 110 may measure a position of the base station itself, based on a reception signal from the satellite positioning system after a power supply of the base station is activated. Position information acquisition may be performed at each very short time.

The subordinate terminal information sharing unit 120 directly transmits the acquired position information of the base station and subordinate terminal information of the base station to one or more of the peripheral base stations 10B and 10C. Each time a communication terminal is connected to a base station, the base station can update the subordinate terminal information of the base station, and transmit the updated information to one or more peripheral base stations.

Further, the subordinate terminal information sharing unit 120 directly acquires, from the peripheral base station 10B, the position information of the peripheral base station 10B, and the subordinate terminal information including an ID of the subordinate communication terminal of the peripheral base station 10B. The subordinate terminal information sharing unit 120 directly acquires, from the peripheral base station 10C, the position information of the peripheral base station 10C, and the subordinate terminal information including an ID of the subordinate communication terminal of the peripheral base station 10C. In another example embodiment, the subordinate terminal information may also include a situation of a UPF processing load in the base station, the number of subordinate terminals, and a communication amount inferred from connection destination information of the subordinate terminal.

The subordinate terminal information sharing unit 120 of each base station performs broadcast transmission, to one or more peripheral base stations, on measured position information, and the latest subordinate terminal information together with an identifier (ID) of the base station itself. Broadcast transmission refers to simultaneous transmission of information of the same content to a large number of parties. As a result, each base station can acquire the position information of the peripheral base station and the subordinate terminal information. The position information of the peripheral base station and the subordinate terminal information are stored in the storage unit 190 of each base station. An integrated access backhaul (IAB) with inter-base-station multi-hop can be used for sharing the position information and the subordinate terminal information. Further, in some example embodiments, a communication path can be established between the base stations by connecting the base stations via a wired network. In another example embodiment, a method of sharing information between the base station and the peripheral base station may be transmission and reception of information via the Internet or an external network, or cross-reference by accessing the cloud via the Internet or an external network. Note that, the subordinate terminal information sharing unit 120 can also use a random backoff algorithm in a wireless LAN in order to avoid a collision at a time of broadcast. The random backoff algorithm is an algorithm that determines a random time to wait before starting data transmission in order to avoid collision by shifting timing of starting the data transmission.

The communication request acceptance unit 130 accepts a connection request from the communication terminal 20A being subordinate to the base station 10A to the communication terminal 20B being subordinate to a base station other than the base station 10A, for example, the base station 10B.

The path setting unit 140 sets a communication path from a first communication terminal to a second communication terminal, based on position information of a base station, position information of each peripheral base station, and subordinate terminal information of one of the peripheral base stations. The base station may acquire identification information of a communication terminal being a connection destination from the position information of the peripheral base station and the subordinate terminal information stored in the storage unit 190 of the base station, and acquire a preset path.

The communication control unit 150 performs communication control between the communication terminal 20A and the communication terminal 20B by using the peripheral base station on the set path.

Figure 7:
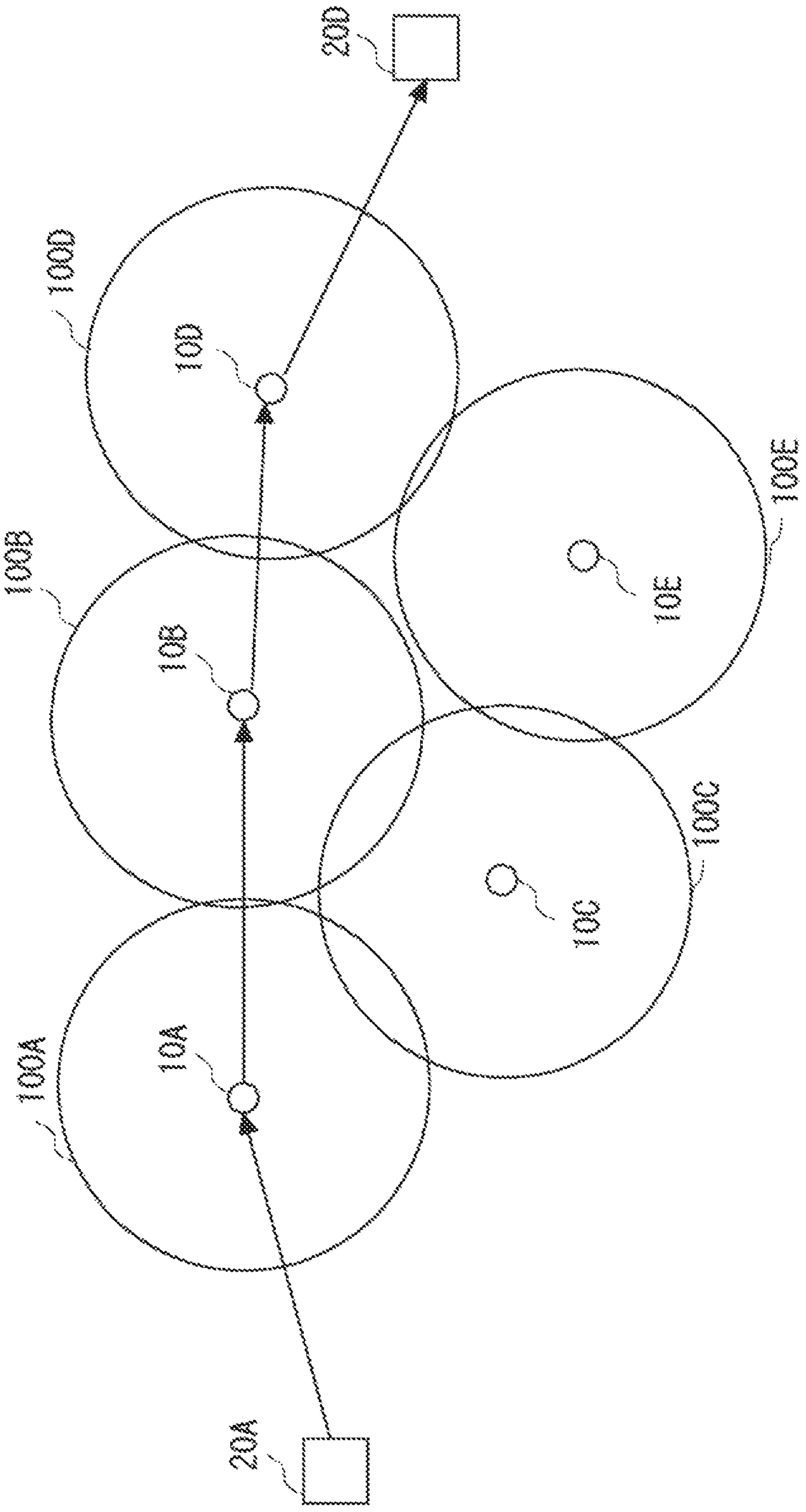
FIG. 7 is a diagram illustrating a communication path setting method according to the second example embodiment.
Figure 8:
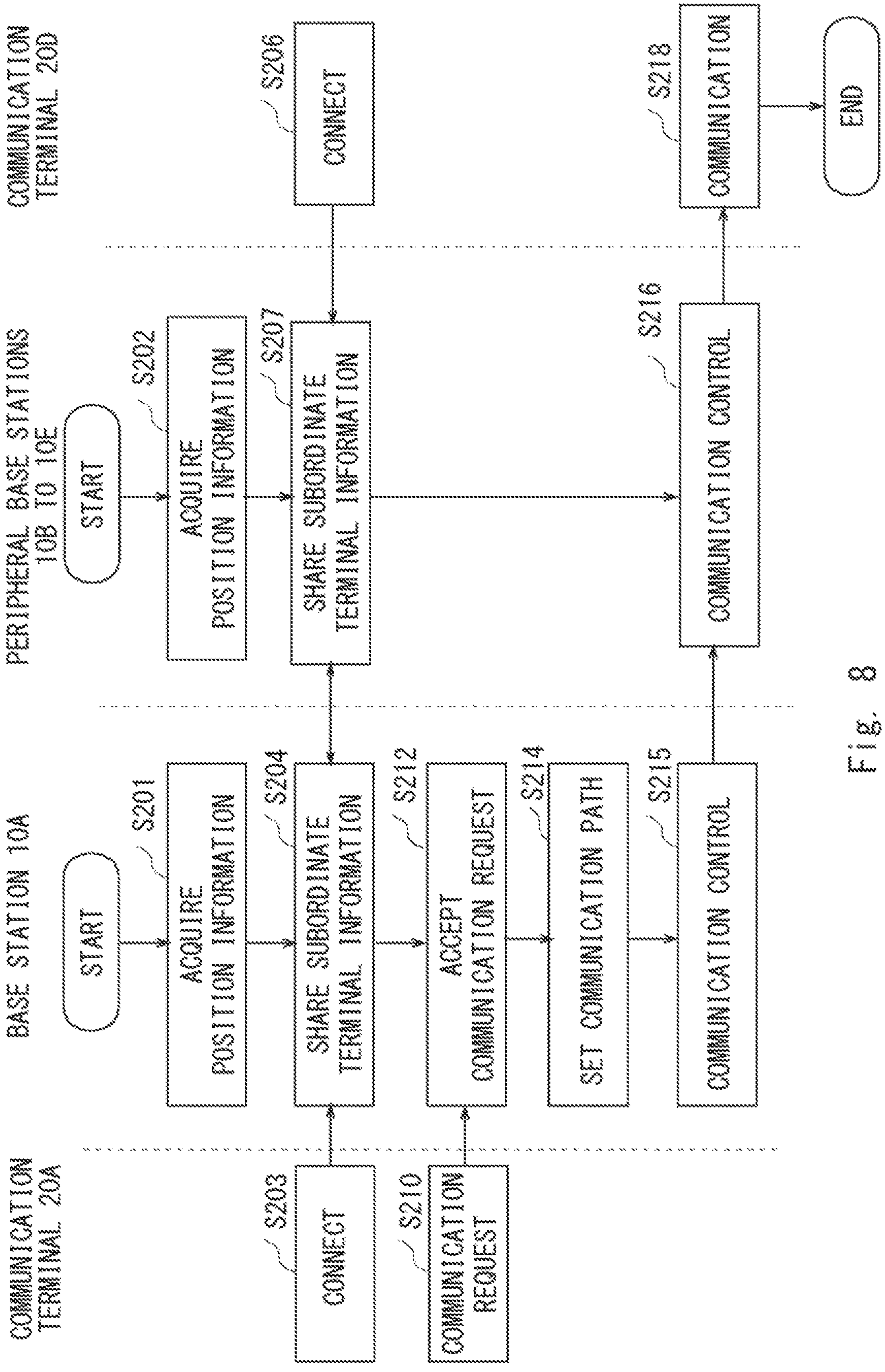
FIG. 8 is a sequence diagram illustrating the communication path setting method according to the second example embodiment.

A communication path setting method will be described with reference to FIGS. 7 and 8. FIG. 8 is a sequence diagram illustrating the communication path setting method.

It is assumed that the communication terminal 20A sends, to the base station 10A, a communication request with a communication terminal 20D as a connection destination. In FIG. 7, the peripheral base stations of the base station 10A may be the base stations 10B, 10C, 10D, and 10E. Note that, an adjacent base station of the base station 10A may be the base stations 10B and 10C that are adjacent to the base station 10A. In other words, the peripheral base station of the base station 10A may exist beyond (farther away from) the adjacent base station of the base station 10A.

As illustrated in FIG. 8, the base station 10A acquires position information (e.g., longitude, latitude, and the like) of the base station 10A by using the GNSS receiver (step S201). Similarly, each of the peripheral base stations 10B to 10E of the base station 10A acquires position information (e.g., longitude, latitude, and the like) of the peripheral base stations 10B to 10E by using the GNSS receiver (step S202).

Next, the communication terminal 20A is wirelessly connected to the base station 10A (step S203). A communication terminal other than the communication terminal 20A may also be wirelessly connected to the base station 10A. The base station 10A acquires current subordinate terminal information, performs broadcast transmission, to the peripheral base stations 10B to 10E, on the acquired current subordinate terminal information together with the position information of the base station 10A described above, and shares the information (step S204).

The communication terminal 20D is wirelessly connected to the peripheral base station 10D (step S206). One or more communication terminals other than the communication terminal 20D may also be wirelessly connected to the peripheral base station 10D. Similarly, the communication terminal 20B is wirelessly connected to the peripheral base station 10B. A communication terminal 20C is wirelessly connected to the peripheral base station 10C. A communication terminal 20E is wirelessly connected to the peripheral base station 10E. Each of the peripheral base stations 10B to 10E acquires the subordinate terminal information, performs broadcast transmission, to the base station 10A (and its peripheral base station), on the acquired subordinate terminal information together with the position information of each of the peripheral base stations 10B to 10E, and shares the information (step S207). Shared information such as the position information and the subordinate terminal information is stored in the storage unit 190 of each of the base stations 10A to 10E.

Subsequently, the communication terminal 20A sends, to the base station 10A, a communication request with the communication terminal 20D as a connection destination (step S210). The base station 10A refers to the storage unit 190 of the base station 10A, acquires the identification information regarding the communication terminal 20D from the shared information, and sets a path from the communication terminal 20A to the communication terminal 20D (step S214). In FIG. 7, a path from the communication terminal 20A to the communication terminal 20D via the base station 10A, and the peripheral base stations 10B and 10D may be set. In this case, since the base station 10D is connected to the communication terminal 20D being the connection destination, it may also be referred to as a termination base station.

The base station 10A, and the peripheral base stations 10B and 10D perform communication control between the communication terminal 20A and the communication terminal 20D (steps S215, and S216). The communication control unit 150 of the base station 10A performs communication control between the first communication terminal 20A, and the peripheral base stations 10B and 10D on the set path and the second communication terminal 20B.

In some example embodiments, a communication path setting system includes a base station, a first communication terminal being subordinate to the base station, one or more peripheral base stations in a vicinity of the base station, and a second communication terminal being subordinate to one of the peripheral base stations. The base station includes: a position information acquisition unit that acquires position information of the base station; a subordinate terminal information sharing unit that directly or indirectly shares the position information of the base station and subordinate terminal information of the base station with the one or more peripheral base stations, and acquires position information for each of the peripheral base stations and subordinate terminal information for each of the peripheral base stations; a communication request acceptance unit that accepts a communication request from the first communication terminal being subordinate to the base station to the second communication terminal being subordinate to the one of the peripheral base stations; and a path setting unit that sets a communication path from the first communication terminal to the second communication terminal, based on position information of the base station, position information of each peripheral base station, and subordinate terminal information of the one of the peripheral base stations in response to acceptance of a communication request. The peripheral base station includes: a position information acquisition unit that acquires position information of the peripheral base station; a subordinate terminal information sharing unit that directly or indirectly shares the position information of the peripheral base station and subordinate terminal information of the peripheral base station with the base station, and acquires position information of the base station and subordinate terminal information for each base station from the base station; and a communication request acceptance unit that accepts a communication request from the base station to the second communication terminal being subordinate to the peripheral base station.

As described above, in the communication path setting system, a plurality of base stations each having a built-in core can share position information and subordinate terminal information with each other, and set an appropriate communication path.

In the examples described above, a program includes an instruction group (or software code) that, when loaded into a computer, cause a computer to perform one or more of the functions described in the example embodiments. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that, the present disclosure is not limited to the above-described example embodiments, and can be appropriately modified without departing from the spirit. Although an example embodiment using a core built-in type base station group has been described, a core non-built-in type base station may exist in the group. The first and second example embodiments can be combined as desirable by one of ordinary skill in the art.

Some or all of the above-described example embodiments may also be described as the following supplementary notes, but are not limited thereto.

(Supplementary Note 1)

A base station including:

a position information acquisition unit configured to acquire position information of a base station;

a subordinate terminal information sharing unit configured to directly or indirectly share the position information of the base station and subordinate terminal information of the base station with one or more peripheral base stations in a vicinity of the base station, and acquire position information for each of the peripheral base stations and subordinate terminal information for each of the peripheral base stations;

a communication request acceptance unit configured to accept a communication request from a first communication terminal being subordinate to the base station to a second communication terminal being subordinate to one of the peripheral base stations; and a path setting unit configured to set a communication path from the first communication terminal to the second communication terminal, based on position information of the base station, position information of each peripheral base station, and subordinate terminal information of the one of the peripheral base stations.

(Supplementary Note 2)

The base station according to supplementary note 1, wherein the base station adopts time division duplex (TDD), and includes a receiver configured to receive a positioning signal from a satellite positioning system, and the position information acquisition unit acquires position information of the base station based on a positioning signal received via the receiver.

(Supplementary Note 3)

The base station according to supplementary note 2, wherein the subordinate terminal information sharing unit transmits, to one or more peripheral base stations by broadcast, state information of the base station together with an identifier of the base station, and acquires, from the peripheral base station by broadcast, state information of the peripheral base station together with an identifier of the peripheral base station.

(Supplementary Note 4)

The base station according to supplementary note 3, wherein the subordinate terminal information sharing unit uses a random backoff algorithm.

(Supplementary Note 5)

The base station according to supplementary note 1, wherein the peripheral base station includes an adjacent base station being adjacent to the base station and a base station existing beyond the adjacent base station.

(Supplementary Note 6)

The base station according to supplementary note 1, further including a core, and being a hand-carried type base station operating according to a cellular communication standard.

(Supplementary Note 7)

The base station according to supplementary note 6, further including a radio unit (RU), a distributed unit (DU), and a central unit (CU).

(Supplementary Note 8)

The base station according to supplementary note 1, further including a communication control unit configured to perform communication control between the first communication terminal, and the peripheral base station and the second communication terminal on a set path.

(Supplementary Note 9)

A communication path setting system including:

a base station;

a first communication terminal being subordinate to the base station;

one or more peripheral base stations in a vicinity of the base station; and a second communication terminal being subordinate to one of the peripheral base stations, wherein the base station includes a position information acquisition unit configured to acquire position information of the base station, a subordinate terminal information sharing unit configured to directly or indirectly share the position information of the base station and subordinate terminal information of the base station with the one or more peripheral base stations, and acquire position information for each of the peripheral base stations and subordinate terminal information for each of the peripheral base stations, a communication request acceptance unit configured to accept a communication request from the first communication terminal being subordinate to the base station to the second communication terminal being subordinate to the one of the peripheral base stations, and a path setting unit configured to set a communication path from the first communication terminal to the second communication terminal, based on position information of the base station, position information of each peripheral base station, and subordinate terminal information of the one of the peripheral base stations in response to acceptance of the communication request, and the peripheral base station includes a position information acquisition unit configured to acquire position information of the peripheral base station, a subordinate terminal information sharing unit configured to directly or indirectly share the position information of the peripheral base station and subordinate terminal information of the peripheral base station with the base station, and acquire position information of the base station and subordinate terminal information for each of the base station, and a communication request acceptance unit configured to accept a communication request from the base station to the second communication terminal being subordinate to the peripheral base station.

(Supplementary Note 10)

A communication path setting method including:

acquiring position information of a base station;

directly or indirectly sharing the position information of the base station and subordinate terminal information of the base station with one or more peripheral base stations in a vicinity of the base station, and acquiring position information for each of the peripheral base stations and subordinate terminal information for each of the peripheral base stations;

accepting a communication request from a first communication terminal being subordinate to the base station to a second communication terminal being subordinate to one of the peripheral base stations; and setting a communication path from the first communication terminal to the second communication terminal, based on position information of the base station, position information of each peripheral base station, and subordinate terminal information of the one of the peripheral base stations.

(Supplementary Note 11)

A program causing a computer to execute:

acquiring position information of a base station;

directly or indirectly sharing the position information of the base station and subordinate terminal information of the base station with one or more peripheral base stations in a vicinity of the base station, and acquiring position information for each of the peripheral base stations and subordinate terminal information for each of the peripheral base stations;

accepting a communication request from a first communication terminal being subordinate to the base station to a second communication terminal being subordinate to one of the peripheral base stations; and setting a communication path from the first communication terminal to the second communication terminal, based on position information of the base station, position information of each peripheral base station, and subordinate terminal information of the one of the peripheral base stations.

An example advantage according to the present disclosure is to provide a base station and the like being capable of setting a communication path across a plurality of base stations when a plurality of integrated-type base stations including a core are used in cooperation with each other.

What is claimed is:

1. A base station comprising:

a core independently provided for the base station, a receiver configured to receive a positioning signal from a satellite positioning system, at least one memory storing instructions, and at least one processor configured to execute the instructions to;

acquire position information of the base station from the receiver;

directly or indirectly share the position information of the base station and subordinate terminal information of the base station with one or more peripheral base stations in a vicinity of the base station, and acquire position information of each of the peripheral base stations and subordinate terminal information of each of the peripheral base stations;

accept a communication request from a first communication terminal being subordinate to the base station to a second communication terminal being subordinate to one of the peripheral base stations; and set a communication path from the first communication terminal, at least via the base station and the one of the peripheral base stations, to the second communication terminal, based on the position information of the base station, the position information of each peripheral base station, and the subordinate terminal information of the one of the peripheral base stations.

2. The base station according to claim 1, wherein the base station adopts time division duplex (TDD), and the at least one processor configured to execute the instructions to acquire the position information of the base station based on the positioning signal received via the receiver.

3. The base station according to claim 2, wherein the at least one processor configured to execute the instructions to transmit, to the one or more peripheral base stations by broadcast, state information of the base station together with an identifier of the base station, and acquire, from the peripheral base stations by broadcast, state information of each peripheral base station together with an identifier of each peripheral base station.

4. The base station according to claim 3, wherein the subordinate terminal information sharing is performed by using a random backoff algorithm.

5. The base station according to claim 1, wherein the peripheral base stations includes an adjacent base station being adjacent to the base station and a base station existing beyond the adjacent base station.

6. The base station according to claim 1, the base station being a hand-carried type base station operating according to a cellular communication standard.

7. The base station according to claim 6, further comprising a radio unit (RU), a distributed unit (DU), and a central unit (CU).

8. The base station according to claim 1, wherein the at least one processor configured to execute the instructions to perform communication control between the first communication terminal, and one of the peripheral base stations and the second communication terminal on a set path.

9. A communication path setting method comprising:

acquiring position information of a base station independently provided with a core, from a receiver configured to receive a positioning signal from a satellite positioning system;

directly or indirectly sharing the position information of the base station and subordinate terminal information of the base station with one or more peripheral base stations in a vicinity of the base station, and acquiring position information of each of the peripheral base stations and subordinate terminal information of each of the peripheral base stations;

accepting a communication request from a first communication terminal being subordinate to the base station to a second communication terminal being subordinate to one of the peripheral base stations; and setting a communication path from the first communication terminal, at least via the base station and the one of the peripheral base stations, to the second communication terminal, based on the position information of the base station, the position information of each peripheral base station, and the subordinate terminal information of the one of the peripheral base stations.

10. The communication path setting method according to claim 9, wherein the base station adopts time division duplex (TDD); and wherein the method further comprising acquiring the position information of the base station based on the positioning signal received via the receiver.

11. The communication path setting method according to claim 10, wherein the subordinate terminal information sharing includes transmitting, to the one or more peripheral base stations by broadcast, state information of the base station together with an identifier of the base station, and acquiring, from the peripheral base stations by broadcast, state information of each peripheral base station together with an identifier of each peripheral base station.

12. The communication path setting method according to claim 11, wherein the subordinate terminal information sharing is performed by using a random backoff algorithm.

13. The communication path setting method according to claim 9, wherein the peripheral base stations includes an adjacent base station being adjacent to the base station and a base station existing beyond the adjacent base station.

14. The communication path setting method according to claim 9, wherein, and is a hand-carried type base station operating according to a cellular communication standard.

15. The communication path setting method according to claim 14, wherein the base station further includes a radio unit (RU), a distributed unit (DU), and a central unit (CU).

16. A non-transitory computer readable medium storing a program causing a computer to execute:

acquiring position information of a base station independently provided with a core, from a receiver configured to receive a positioning signal from a satellite positioning system;

directly or indirectly sharing the position information of the base station and subordinate terminal information of the base station with one or more peripheral base stations in a vicinity of the base station, and acquiring position information of each of the peripheral base stations and subordinate terminal information of each of the peripheral base stations;

accepting a communication request from a first communication terminal being subordinate to the base station to a second communication terminal being subordinate to one of the peripheral base stations; and setting a communication path from the first communication terminal, at least via the base station and the one of the peripheral base stations, to the second communication terminal, based on the position information of the base station, the position information of each peripheral base station, and the subordinate terminal information of the one of the peripheral base stations.

17. The non-transitory computer readable medium storing the program according to claim 16, wherein the base station adopts time division duplex (TDD), and the program causing the computer to further execute acquiring the position information of the base station based on the positioning signal received via the receiver.

18. The non-transitory computer readable medium storing the program according to claim 17, wherein the subordinate terminal information sharing includes transmitting, to the one or more peripheral base stations by broadcast, state information of the base station together with an identifier of the base station, and acquiring, from the peripheral base stations by broadcast, state information of each peripheral base station together with an identifier of each peripheral base station.

19. The non-transitory computer readable medium storing the program according to claim 18, wherein the subordinate terminal information sharing is performed by using a random backoff algorithm.

20. The non-transitory computer readable medium storing the program according to claim 16, wherein the peripheral base stations includes an adjacent base station being adjacent to the base station and a base station existing beyond the adjacent base station.

* * * * *